(12) United States Patent
Johnson

(10) Patent No.: US 6,709,078 B2
(45) Date of Patent: Mar. 23, 2004

(54) DECORATIVE, ADJUSTABLE, PROTECTIVE, COVER FRAME FOR ELECTRONIC EQUIPMENT AND FURNITURE

(76) Inventor: Gloria Johnson, 1611 Sun Lake Dr., St. Charles, MO (US) 63301

(*) Notice: Subject to any disclaimer, the term of this patent is extended or adjusted under 35 U.S.C. 154(b) by 0 days.

(21) Appl. No.: 09/765,038

(22) Filed: Jan. 19, 2001

(65) Prior Publication Data

US 2002/0096979 A1 Jul. 25, 2002

(51) Int. Cl.[7] .............................................. A47B 53/00
(52) U.S. Cl. ...................................... 312/205; 248/924
(58) Field of Search .................................. 312/204, 205; 108/137, 138, 143, 144.11, 147.21; 248/918, 924

(56) References Cited

U.S. PATENT DOCUMENTS

| | | | | |
|---|---|---|---|---|
| 1,827,512 A | * | 10/1931 | Frank et al. | ............ 312/205 X |
| 2,664,258 A | * | 12/1953 | Lanier | ..................... 248/924 X |
| 2,698,152 A | * | 12/1954 | Kaye | ....................... 248/924 X |
| 2,986,366 A | * | 5/1961 | Wesson | ................... 248/924 X |
| 5,016,772 A | * | 5/1991 | Wilk | .............................. 220/8 |
| 5,303,057 A | * | 4/1994 | Davidow et al. | ........ 312/205 X |
| 5,435,644 A | * | 7/1995 | Schuh et al. | ............. 312/205 X |
| 5,564,209 A | * | 10/1996 | Zagnoli | .................. 248/918 X |
| 5,683,066 A | * | 11/1997 | McCann | .................. 248/918 X |
| 5,772,029 A | * | 6/1998 | Boccacci | ................. 312/205 X |
| 5,795,041 A | * | 8/1998 | Weaver | ....................... 312/205 |
| 6,076,309 A | * | 6/2000 | Daoud | .................... 312/205 X |

FOREIGN PATENT DOCUMENTS

| | | | | |
|---|---|---|---|---|
| DE | 3939525 C1 | * | 3/1990 | ................. 312/205 |
| FR | 2903226 | * | 7/1994 | ................. 312/205 |

* cited by examiner

Primary Examiner—Janet M. Wilkens
Assistant Examiner—Hanh V. Tran
(74) Attorney, Agent, or Firm—Henry W. Cummings

(57) ABSTRACT

An adjustable, retractable, and expandable plastic or cardboard cover frame, for example made of natural or synthetic wood grain or metallic finish, that wold fit around a computer, television, VCR, or other electronic component, so as to mask the view of unsightly appliances and provide a decorative touch to the room. The product is produced with several types of fine wood and metallic finishes, allowing the user to choose a model that compliments or matches the furniture in their enviroment. In one embodiment the adjustable frame wold come in several sizes and wold be expandable or retractable to accommodate any size computer CPU, computer monitor, matching keyboard cover, television, VCR, as well as stereo equipment. The three dimensional ability to expand in height, width, and depth would allow the various sized models to adjust to fit virtually any size electronic component, and would fold flat for ease of packaging and manufacture.

2 Claims, 3 Drawing Sheets

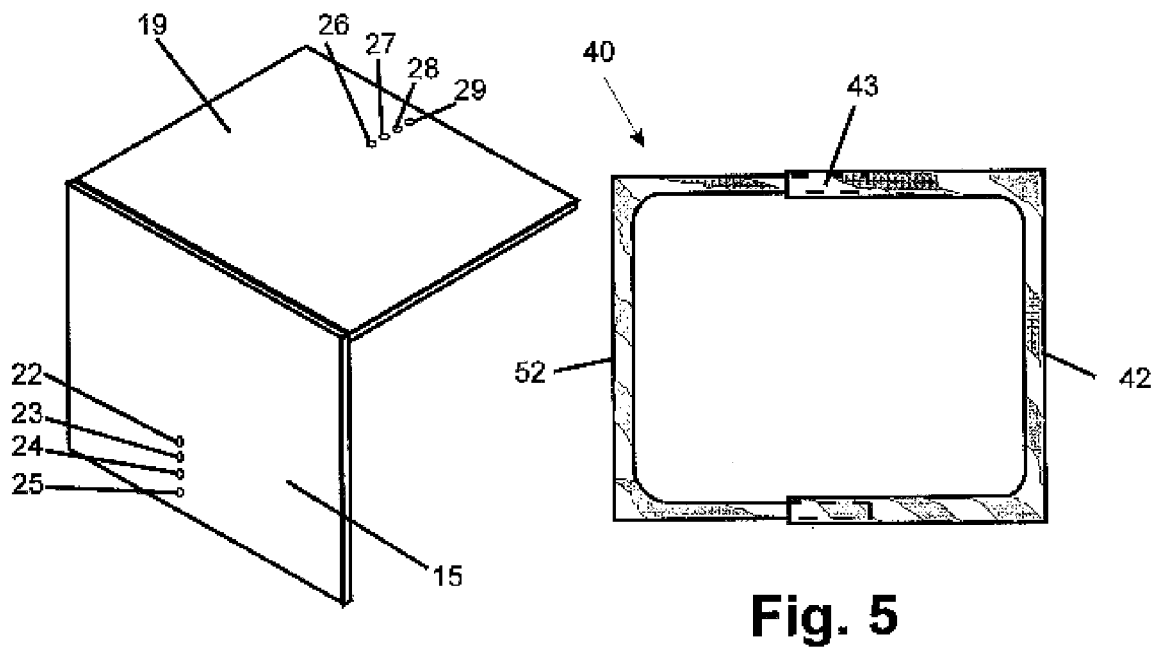
Fig. 4
Fig. 5
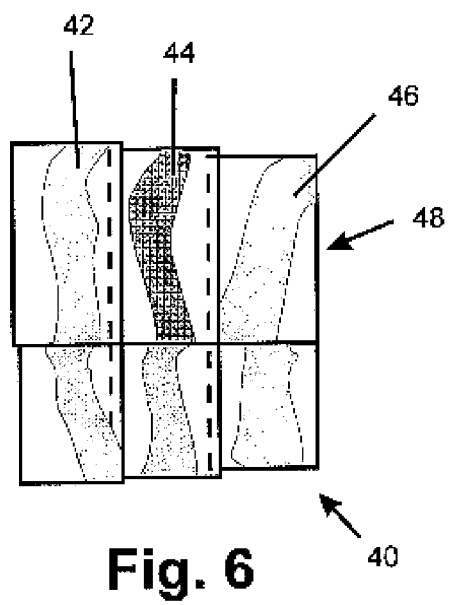
Fig. 6

DECORATIVE, ADJUSTABLE, PROTECTIVE, COVER FRAME FOR ELECTRONIC EQUIPMENT AND FURNITURE

I BACKGROUND OF THE INVENTION

U.S. Pat. Nos. 3,660,591; 4,685,255; 5,321,579; 4,836,486; 3,248,147; and 5,294,193 disclose various adjustable furniture and, electrical component supports.

II SUMMARY OF THE INVENTION

A) Objects of the Invention

One object is to provide a simple and easy method of converting unsightly electronic components such as those in black and/or gray, to a more attractive appearance and/or color scheme.

Another object is to provide protection to the electronic components.

Another object is to provide a built-in, custom made appearance at a fraction of the cost.

B) Summary

The present invention comprises an adjustable, retractable, and expandable plastic or cardboard cover frame, for example made of natural or synthetic wood grain or metallic finish, that would fit around a computer, television, VCR, or other electronic component, so as to mask the view of unsightly appliances and provide a decorative touch to the room. The product is produced with several types of fine wood and metallic finishes, allowing the user to choose a model that compliments or matches the furniture in their environment.

In one embodiment the adjustable frame would come in several sizes and would be expandable or retractable to accommodate any size computer CPU, computer monitor, matching keyboard cover, television, VCR, as well as stereo equipment. The three dimensional ability to expand in height, width, and depth would allow the various sized models to adjust to fit virtually any size electronic component, and would fold flat for ease of packaging and manufacture. The frame is produced in various materials, allowing the user to choose a model that best fits their budget. High-end models could be constructed with natural wood veneers, and low-end models would have synthetic wood finishes. All models would be available in several fine wood and metallic finishes.

III. THE DRAWINGS

FIG. 4 is a perspective fragmental view of FIG. 1.

FIG. 5 is a front elevation view of the embodiment in FIG. 7.

FIG. 6 is a side elevation of the embodiment in FIG. 7.

IV. DESCRIPTION OF PREFERRED EMBODIMENTS

The present invention comprises an adjustable, retractable, and expandable plastic, metal, wood, or cardboard enclosure having a fine wood grain or metallic finish that is adapted to fit around a computer, television, VCR, or electronic component.

In one embodiment the device is manufactured in several sizes to accommodate any size computer CPU, computer monitor, television, VCR, or stereo component. The unique three dimensional ability to expand in height, width, and depth allows a particular model to be adjusted to fit virtually any size electronic component.

Moreover, it folds flat for ease of packaging and transfer.

Both high-end and low-end models would be produced, allowing the purchaser to choose a model that best fits their budget. For example high-end models are constructed with natural wood veneers, and low-end models may have synthetic wood finish. High end models are produced with several types of fine wood finishes and metallic finishes such as "Soft Pewter," and "Old Gold," allowing the user to choose a model that best compliments or matches the decor.

In use, the user would simply purchase the size, color, and style of their choice, and slip the casing over their electronic component, adjusting it accordingly. The unique threedimensional ability of the support to expand in height, width, and depth allows the selected size to be adjusted to fit virtually any size component. The user would then enjoy the benefit of having the case of their computer monitor, CPU, television, VCR, and other miscellaneous electronic components masked from view, by the attractive wood grain or metallic finish of the enclosure.

Not only would it make the unsightly equipment more attractive, but would also provide additional protection to them, as the additional barrier would prevent spills and dust from being able to reach the equipment.

The fine wood finishes, available in all popular furniture wood grains and colors, provide an aesthetic touch and may be selected to compliment the existing furniture in a given room, and protects and beautifies existing furniture.

The metallic finishes offer coordinating colors for even greater latitude. The metallic finishes offer a built-in effect at a fraction of the cost of expensive entertainment centers, computer hutches, etc.

Also, the invention provides a practical and easy method of allowing anyone to add that final decorative touch to their home, office, workplace, or any environment requiring protection, coordination, an/or beautification. The invention can be used in any domestic, commercial, or industrial environment.

Figure 1:
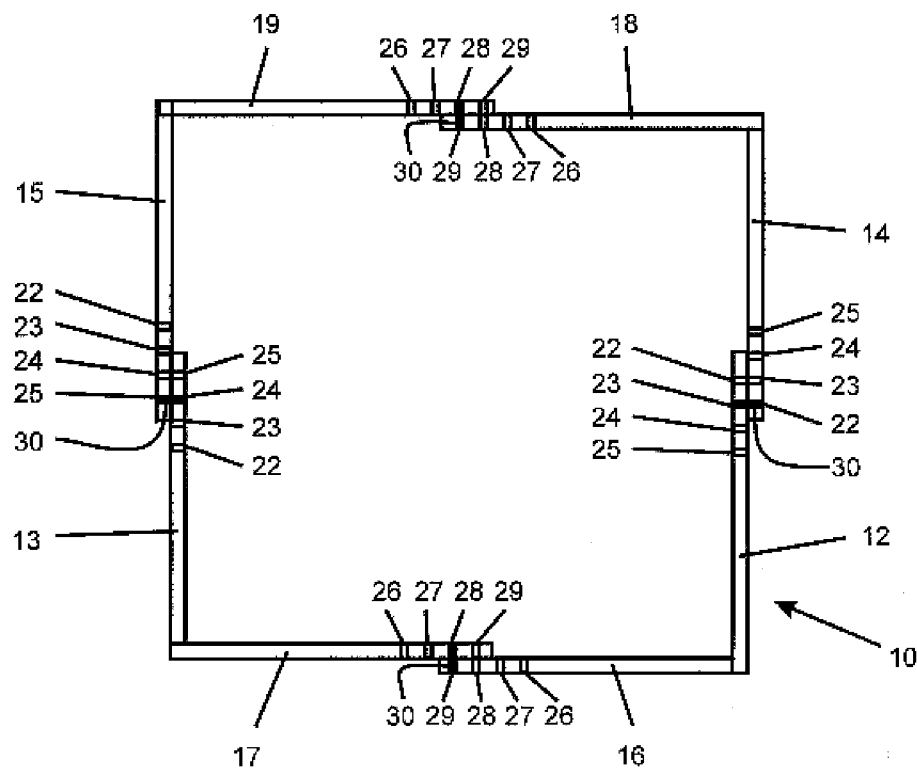
FIG. 1 is a front elevation view of one embodiment of the present invention, without electronic components in place.
Figure 2:
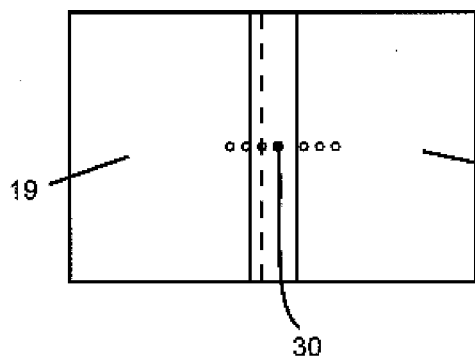
FIG. 2 is a top view of the embodiment of the embodiment in FIG. 1.

FIGS. 1 and 2 show the support 10 including decorative vertical legs 12, 13, 14, 15, and decorative horizontal legs 16, 17, 18 and 19 each having respective spaced openings 22, 23, 24, 25, 26, 27, 28 and 29 allowing selective lenght and width adjustment, as indicated in FIG. 4, and held in place with removable mechanical fasteners 30.

Figure 3:
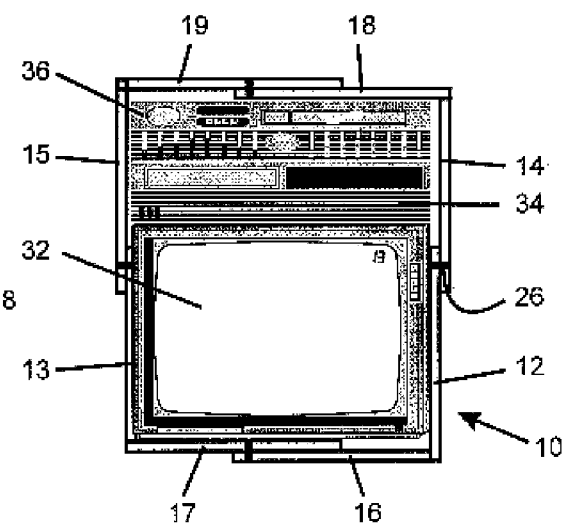
FIG. 3 is a front elevation view of the embodiment in FIG. 1, with a television and other electronic equipment in place.
Figure 7:
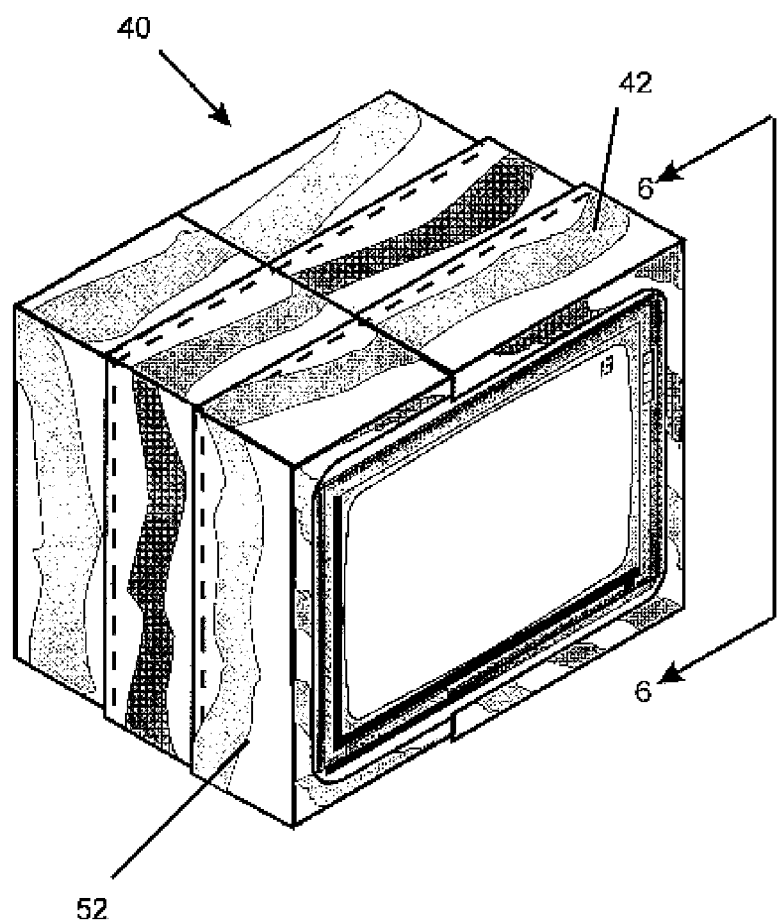
FIG. 7 is a perspective view of another embodiment of the invention.
Figure 8:
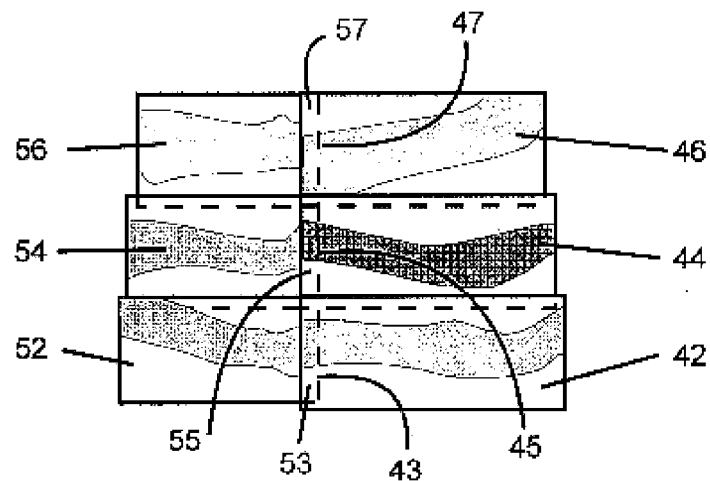
FIG. 8 is a top view of embodiment in FIG. 4.

FIG. 3 shows placement of electronic components, TV 32, VCR 34, and a stereo receiver 36 as examples.

In another embodiment shown in FIGS. 5–8, a decoarative T. V. and electronic equipment enclosure 40 includes front supports 42, 52; middle supports 44, 54; and rear end supports 46, 56. The external dimensions of the supports decrease as shown in FIG. 6. The respective left 52, 54, 56 sections have extensions 53, 55, 57 which telescope within slots 43, 45, 47 the right sections 42, 44, and 46 as illustrated in FIGS. 5 and 6. Oviously this arrangement could be reversed. The units are hollow and opening 48 is provided in the rear for connections. The type of wood or venneer may very as desired.

What is claimed is:

1. A decorative, adjustable, electronic equipment and furniture cover comprising:

a plurality "U" shaped members, each having at least a vertical portion and a horizontal portion;

adjustable fastening means provided at the distal ends of each said "U" shaped members for connecting said members to form a substantially rectangular shape;

said "U" shaped members being sized such as to encompass various length, widths and heights of various electronic components, and being sized such that upon removal of selected ones or all of said fastening means, said "U" shaped members may be stacked together for storage or transfer, and wherein a first member of said purality "U" shape members telescopes within a second member of said plurality of "U" shaped; members, and wherein said adjustable fastening means connecting said first and second members comprise a plurality of slots in one of said first and second members, and projecting means in the other of said first and second members extending through said slots to adjust the by overall length or width of said members.

2. A decorative, adjustable, electronic equipment and furniture cover according to claim 1 wherein said members are made from a decorative material selected from the group consisting of natural wood, natural wood veneers, metal and synthetic wood finishes.

* * * * *